Feb. 18, 1958  A. MYRING  2,823,804
FILTER COMBINED WITH GRAVITATION SEPARATOR
Filed March 17, 1954
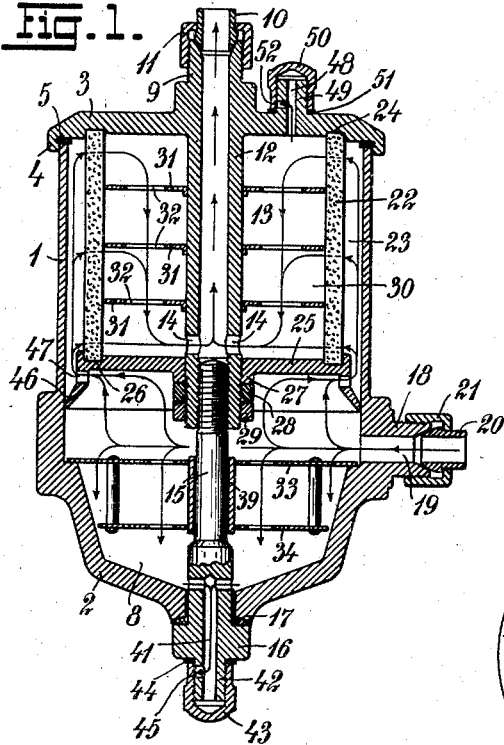
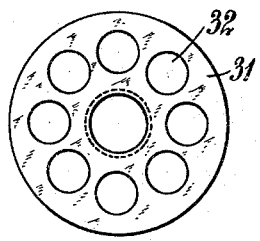
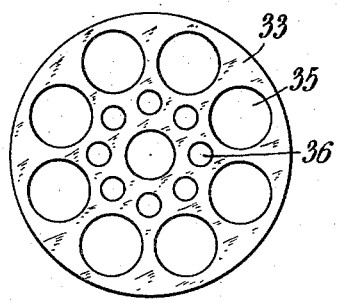
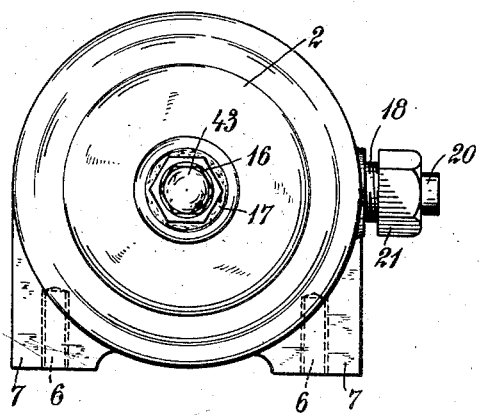
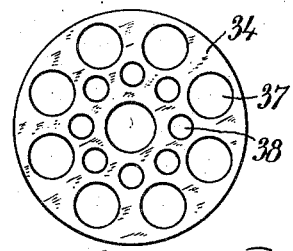

United States Patent Office 2,823,804
Patented Feb. 18, 1958

2,823,804

FILTER COMBINED WITH GRAVITATION SEPARATOR

Aksel Myring, Oslo, Norway

Application March 17, 1954, Serial No. 416,747

5 Claims. (Cl. 210—305)

The present invention relates to filters for purification of lubrication oil, benzine and fuel oil for internal combustion engines. The filter may be used for all purposes, where purification of oil and benzine by means of a filter is necessary. However, the filter is especially adapted for use in sea crafts with driving machinery.

The invention has for its object to provide for a filter, which is simple and inexpensive to manufacture, easy to dismount for cleaning purposes and effectively prevents the filtrate from being mixed with solid impurities, water and air or another gas even if the craft is being exposed to the most violent rolling and pitching causing the filter being often brought into strongly oblique positions.

The present filter is of the kind consisting of an upright housing having an inlet and an outlet for the oil and the like, in which housing is axially mounted a filtering member shaped substantially as a hollow cylinder closed at the lower end by means of a tight bottom plate. The oil inlet of the filter is provided in the wall of the housing below the filtering member for allowing water and a substantial part of the impurities contained in the oil to sink to the bottom in the lower part of said housing before the oil is flowing upwards and by the bottom plate of the filtering member is being forced to flow into the cylindrical space between the housing and the filtering member and therefrom inwards through the filtering member to the oil outlet.

The main feature of the invention is that the oil outlet, being situated at the upper end of the housing, communicates directly with the inner space of the filtering member through a channel, which leads into said space through the upper end of the filtering member and continues downwards in said space through a tube connected to the top cover of said housing, the oil inlet opening and openings respectively of said tube being situated near the bottom plate of said filtering member. The air and gas mixed with oil thereby being collected in the upper part of the housing without having any possibility of entering the outlet channel of the oil.

Further features of the invention will be described below with reference to the accompanying drawing, on which an embodiment of the invention is shown.

Figure 1 is an axial sectional view of the filter, and

Figure 2 is a bottom view of the same.

Figure 3 is a plan view of one of a number perforated plates mounted within the filtering member for stiffening purposes.

Figure 4 is a plan view of a perforated plate adapted to be placed in the lower part of the housing below the oil inlet, and Figure 5 is a plan view of a corresponding plate adapted to be placed below the plate according to Figure 4.

The filter consists of a preferably cylindrical housing 1 with a bottom 2 and a removable cover 3. Said cover is provided with an edge flange 4 projecting downwards and being adapted to embrace the upper end portion of said housing. Between the top cover and the upper edge of the housing a packing ring 5 is provided. Under normal conditions said housing is vertical and is secured in this position by means of bolts, which are secured into screw holes 6 in fastening members 7 projecting from the housing as shown in Figure 2.

The bottom 2 has such a shape that the lower part 8 of the housing tapers in a suitable manner towards the middle part of the bottom, being at said middle part as described below provided an outlet opening for water and settlings, which during the use of the filter is collecting in the lower part 8 of the housing.

To the middle part of the upper side of the cover 3 a short pipe 9 is connected, said pipe according to the embodiment shown being made in one piece with the cover. Said pipe 9, forming the oil outlet of the filter, is at the upper end provided with a nipple 10, which is secured by means of a nut 11. Said nipple is adapted for connecting the pipe 9 to a pipe line leading for instance to an engine cylinder or the like. To the middle part of the lower side of said cover another pipe 12 is connected projecting axially downwards into the housing. Also the pipe 12 may be made in one piece with the cover. Said pipes 9 and 12 communicate with each other forming thereby an oil outlet channel 13, into which the oil from the housing flows through one or more side openings 14 in the lower part of said pipe 12.

The cover 3 is secured in closed position by means of a bolt 15 provided axially in the housing and projecting into the housing through an opening in the middle part of the bottom 2, the upper threaded part of said bolt being screwed into the lower threaded end part of the pipe 12. A packing 17 is provided between the head 16 of said bolt 15 and the bottom 2. As it will be seen the lower end part of the pipe 12 is closed by the bolt 15. Said inlet openings 14 in the pipe 12 are situated just above the upper end of the bolt 15.

The oil inlet of the filter consists of a short pipe 18 having an inlet channel 19. The pipe is connected to the wall of the housing 1 above the lower part 8 of the housing but below the filtering member, which will be described below. The outer end of said pipe 18 is provided with a nipple 20, which is secured by means of a nut 21 and enables the pipe 18 to be connected to a pipe line from the oil tank. The oil inlet is provided with a cock for regulating and turning off the oil supply.

The filtering member preferably consists of a hollow cylinder 22 with a comparatively thick wall made of a material, for instance felt or the like, suitable for filtering purposes. The filtering cylinder is coaxially mounted in the upper part of the housing 1, and the diameter of the cylinder is somewhat smaller than the inner diameter of the housing, thereby a cylindrical space 23 being formed between the filtering cylinder and the wall of the housing. Said space 23 is closed at the upper end and communicates with the lower part of the housing at the lower end. The upper end of the filtering cylinder 22 abuts against the lower side of the cover 3 and engages an annular groove 24 in the cover. Said groove serves for centering of the filtering cylinder and for securing a reliable tightening. The lower end of the filtering cylinder abuts against a circular, tight plate 25 and engages an annular groove 26 for centering and tightening purposes. The plate 25 forms the bottom plate of the filtering cylinder and is provided with a central hole and a boss 27 projecting downwards. The plate is axially adjustably and tightly mounted on the lower end part of the pipe 12. When the plate is being displaced upwards the filtering cylinder is being clamped between the plate and the cover 3. Securing of the plate 25 in clamped position is effected by means of two nuts 28 and 29 mounted on the threaded lower part of the pipe 12.

The space 30 in the filtering cylinder 22 communicates only with the outlet channel 13 through the openings 14 situated just above the plate 25. When the filter is being used a suction, for instance from an oil pump, will be effected in the space 30 and the outlet channel 13, the middle part of the filtering cylinder thereby having the tendency to be bent inwards. In order to prevent this effect for instance three stiffening discs 31 or the like are being provided in the space 30. Said discs are fastened to the pipe 12 and are provided with holes 32.

In the lower part 8 of the housing below the oil inlet a suitable number, in the present case two, circular and vertically spaced plates 33 and 34 are provided having holes 35, 36 and 37, 38 respectively arranged in a suitable manner. Said holes suitably may be arranged along two concentric circles and have different sizes. The plates 33 and 34 are secured to the ends of a sleeve 39 displaceably mounted on the bolt 15, so that the plates easily can be removed in one operation when the filter is to be demounted. The upper plate 33 is loosely supported by an annular shoulder 40 in the housing. The plates 33 and 34 have the effect of damping the flow movement of the oil in the lower part 8 of the housing with the object of enabling water and impurities to sink to the bottom for being drained at suitable intervals. This draining takes place through a channel 41 in the bolt head 16, which is provided with a threaded, projecting portion 42. Onto this portion a cap 43 is screwed normally closing the outlet of said channel 41. Between the cap and the bolt head a packing 44 is provided. The channel 41 suitably communicates with a side outlet 45 in the projecting portion 42 of the bolt head, thereby draining being enabled by screwing the cap 43 partly off the portion 42 for uncovering said outlet 45.

At the outer edge the bottom plate 25 of the filtering cylinder is provided with an annular flange 46 projecting downwards and widening in the downward direction. The free edge of said flange fits tightly against the inner cylindrical surface of the housing 1, said housing thereby being divided into an upper and a lower space. The flange 46 is provided with a number of holes 47, through which the oil flowing upwards must pass. Thereby the flange prevents a substantial part of the impurities, which have not sunk to the bottom in the lower part 8 of the housing, from following the oil flowing upwards to the filtering member.

The cover 3 is provided with a device for blowing off air and gas. According to the embodiment shown said device comprises a channel 48 provided in the cover 3 and a threaded projection 49 from the cover. Onto said projection is screwed a cap 50, and between the cap and the cover a packing 51 is provided. The channel 48 communicates with a side outlet 52 in said projection 49, said outlet normally being closed by the cap and is being uncovered by partly screwing the cap off said projection.

The manner of action of the filter is as follows: By opening the cock in the oil supply line oil from the oil tank, which is mounted at a higher level than the filter, will be admitted through the inlet 19 thereby filling up all the spaces of the housing outside the filter cylinder 22. During this filling process the air in the housing is being blown off through the channel 48 by unscrewing the cap 50. Owing to the oil pressure the oil also will be pressed through the filter cylinder and fill up the space 30 and the outlet channel 13. When the working of the filter is started by connecting the outlet channel 13 for instance with the cylinder of an internal combustion engine having a suction pump, the oil owing to the oil pressure and to the suction from the oil pump will flow continuously at a slow speed through the housing from the inlet to the outlet. The oil in the lower part 8 of the housing will not move substantially as the flowing movement is being prevented or subdued by the perforated plates 33 and 34. When, therefore, the oil from the inlet is flowing along the upper plate 33 at a low speed, the water and comparatively heavy impurities possibly contained in the oil will sink to the bottom, as indicated by the arrows pointing downwards, substantially independently of the upward flow of the oil. Draining of the settlings at intervals may be effected through the draining channel 41.

After having got rid of water and heavier impurities the oil flows from the space just above the plate 33 upwards towards the bottom plate 25 of the filtering cylinder. Said bottom plate forces the oil outwards through the holes 47 into the cylindical space 23 outside the filtering cylinder. From said space the oil is being forced through the filtering cylinder, which withholds impurities possibly dispersed in the oil. Thereby filtrated oil flows into the inner space 30 of the filtering cylinder and therefrom through the openings 14 into the outlet channel 13. The direction of flow through the filter is indicated by arrows.

As the oil coming from the oil tank frequently also contains air and possibly other gases it is very important that said air and gases are not being brought along with the oil out of the filter. By ordinary filters this easily will occur especially when the filters are mounted in sea crafts and the sea is heavy, in which case the filter frequently is being moved into strongly oblique positions. By the filter here described such a bringing along of air is practically impossible. The air in the oil namely will rise in the cylindrical space 23 and be collected in the upper part of the same, from which space the air is being sucked through the filtering cylinder into the upper part of the space within the cylinder. The air, however, will have no opportunity to pass downwards to the channels 14 of the pipe 12 even if the filter has strongly oblique positions. It also is important that the pipe 12 is situated coaxially in the housing, as thereby the air quantities collected in the upper part of the space 30 always will have the same distance from the openings 14 independently of the oblique position of the filter. At intervals the air and gas collected in the space 30 must be blown off by loosening the cap 50.

As mentioned above the filter is being mounted at such a level relative to the oil tank that the oil in the filter always has a certain pressure. Therefore it is possible at any time to drain the settlings and blow off air and gas under any conditions, for instance at full speed of the engine, without influencing the function of the filter.

An important quality of the filter here described is that the filtering cylinder 22 easily can be effectively cleaned. When the cleaning is to be done the bolt 15 is being screwed out of the pipe 12, and then the filtering cylinder is being pulled out of the housing 1 together with the cover 3 and the bottom plate 25. Thereafter the bolt again is being screwed into the pipe 12. When now oil or air under a suitable pressure is being admitted through the upper end of the pipe 12 the oil and air respectively will be pressed radially outwards through the filtering cylinder, the solid impurities collected on the outer surface of the cylinder during the use of the filter thereby being removed.

I claim:

1. A filter for lubricating oil, benzine and fuel oil, comprising an upright housing provided with oil inlet and outlet, a hollow filtering cylinder mounted axially in said housing and in spaced relationship to the same, a tight bottom plate closing the lower end of said filtering cylinder above the level of said oil inlet, the oil outlet in the upper end of the housing communicating with the inner space of the filtering cylinder through a channel in a pipe the latter extending downwards in the filtering cylinder from the top cover of the housing, said pipe having one or more inlet openings in the wall thereof situated near the bottom plate of the filtering cylinder, whereby the contents of air and gas in the oil will be collected in the upper part of the filter, the said bottom plate being mounted axially adjustable on the outlet pipe, the latter extending through the bottom plate a threaded bolt closing said pipe at the lower end whereby said filtering cylinder can be clamped between the top cover and the bottom plate.

2. A filter as claimed in claim 1, characterized in that the filtering cylinder inside is provided with a plurality of perforated circular discs for stiffening purposes.

3. A filter as claimed in claim 1, characterized in that in the part of the housing situated below the oil inlet is provided with one or more circular, vertically spaced perforated plates adapted for damping the flow of oil in the lower part of the housing, thereby enabling water and impurities to sink to the bottom for being drained at suitable intervals.

4. A filter as claimed in claim 3, characterized in that the perforated plates are secured to a sleeve mounted displaceably on the bolt, the upper plate being loosely supported by an annular shoulder in the housing.

5. A filter as claimed in claim 1, characterized in that the bottom plate is provided with an annular flange projecting downwards and provided with holes, said flange widening in the downward direction and fitting tightly against the inner surface of the housing, thereby dividing the filter into an upper and a lower space.

References Cited in the file of this patent

UNITED STATES PATENTS

| | | |
|---|---|---|
| 972,281 | Stamets | Oct. 11, 1910 |
| 1,062,236 | Hitcock | May 20, 1913 |
| 1,081,936 | Hapgood | Dec. 16, 1913 |
| 1,602,935 | Rasey | Oct. 12, 1926 |
| 1,638,066 | Smythe | Aug. 9, 1927 |
| 1,675,378 | Pearson | July 3, 1928 |
| 1,724,690 | Aldrich | Aug. 13, 1929 |
| 1,744,837 | Pelletier | Jan. 28, 1930 |

FOREIGN PATENTS

| | | |
|---|---|---|
| 25,647 | France | Jan. 17, 1923 |
| 699,299 | France | Dec. 9, 1930 |
| 1,058,438 | France | Nov. 4, 1953 |
| 83,376 | Norway | Mar. 22, 1954 |